United States Patent
Stancu et al.

(10) Patent No.: US 8,739,400 B2
(45) Date of Patent: Jun. 3, 2014

(54) PRESS ASSEMBLY AND METHOD FOR BENDING ELECTRICAL TERMINALS OF BATTERY CELLS

(75) Inventors: Janina Stancu, La Salle (CA); Kenneth J. Oswandel, Livonia, MI (US); Kwok Tom, Madison Heights, MI (US); William Koetting, Davisburg, MI (US)

(73) Assignee: LG Chem, Ltd., Seoul (KR)

( * ) Notice: Subject to any disclaimer, the term of this patent is extended or adjusted under 35 U.S.C. 154(b) by 720 days.

(21) Appl. No.: 12/897,097

(22) Filed: Oct. 4, 2010

(65) Prior Publication Data

US 2012/0079711 A1 Apr. 5, 2012

(51) Int. Cl.
*H01M 6/00* (2006.01)

(52) U.S. Cl.
USPC ............................................. 29/845; 29/623.1

(58) Field of Classification Search
USPC ............................ 29/623.1, 845, 566.2, 566.3
See application file for complete search history.

(56) References Cited

U.S. PATENT DOCUMENTS

| | | | | |
|---|---|---|---|---|
| 3,500,147 A | * | 3/1970 | Hirschberg | 361/293 |
| 4,214,519 A | | 7/1980 | Stollenwerk et al. | |
| 5,778,527 A | * | 7/1998 | Barenboim et al. | 29/845 |
| 6,279,224 B1 | | 8/2001 | Wirtz et al. | |
| 6,632,538 B1 | * | 10/2003 | Yamazaki et al. | 428/461 |
| 6,735,852 B2 | | 5/2004 | Barge et al. | |
| 6,834,424 B2 | | 12/2004 | Shannon | |
| 2007/0113985 A1 | | 5/2007 | Gysi et al. | |
| 2007/0214627 A1 | | 9/2007 | Hampel et al. | |
| 2008/0271311 A1 | | 11/2008 | Hill et al. | |
| 2010/0306995 A1 | | 12/2010 | Scheuerman et al. | |

FOREIGN PATENT DOCUMENTS

| | | |
|---|---|---|
| JP | 57194838 A | 11/1982 |
| JP | 61077255 A | 4/1986 |
| JP | 3019730 A | 1/1991 |
| JP | 10144340 A | 5/1998 |
| JP | 2007170672 A | 7/2007 |

OTHER PUBLICATIONS

U.S. Appl. No. 12/889,973, filed Sep. 24, 2010 entitled Ultrasonic Welding Assembly and Method of Attaching an Anvil to a Bracket of the Assembly.
U.S. Appl. No. 12/890,047, filed on Sep. 24, 2010 entitled Apparatus for Assembly of a Press-Fit Modular Work Piece.
U.S. Appl. No. 13/077,124, filed Mar. 31, 2011 entitled Tape Application Machine and Method for Applying an Electrically Non-Conductive Tape to a Battery Cell.

* cited by examiner

*Primary Examiner* — Mark F Huff
*Assistant Examiner* — Monique Wills
(74) *Attorney, Agent, or Firm* — Buckert Patent & Trademark Law Firm, P.C.; John F. Buckert

(57) ABSTRACT

A press assembly and a method for bending electrical terminals of battery cells are provided. The assembly includes a supporting member that holds a body portion of a cell thereon. The cell has first and second electrical terminals. The assembly further includes a lower plate having first and second dies that hold the first and second electrical terminals, thereon. The assembly further includes an upper plate having third and fourth dies, and guide rods disposed between the lower plate and the upper plate. The upper plate moves vertically on the guide rods relative to the lower plate. The assembly further includes an actuation assembly moving the upper plate toward the lower plate such that the first electrical terminal is bent into a first predetermined shape between the first and third dies, and the second electrical terminal is bent into a second predetermined shape between the second and fourth dies.

14 Claims, 15 Drawing Sheets

PRESS ASSEMBLY AND METHOD FOR BENDING ELECTRICAL TERMINALS OF BATTERY CELLS

TECHNICAL FIELD

This application relates generally to a press assembly and a method for bending electrical terminals of battery cells.

BACKGROUND

A battery module has a plurality of battery cells each having terminals. It is difficult, however, to bend the terminals when installing the battery cells in the battery module.

Accordingly, the inventors herein have recognized a need for an improved press assembly and method for bending electrical terminals of battery cells that eliminates and/or reduces the above mentioned deficiency.

SUMMARY

A press assembly for bending electrical terminals of battery cells in accordance with an exemplary embodiment is provided. The press assembly includes a supporting member configured to hold a first body portion of a first battery cell thereon. The first battery cell has first and second electrical terminals extending from the first body portion. The press assembly further includes a lower plate having first and second dies coupled thereto. The first and second dies are configured to hold the first and second electrical terminals, respectively, of the first battery cell thereon. The press assembly further includes an upper plate having third and fourth dies coupled thereto. The press assembly further includes at least first and second guide rods being disposed between the lower plate and the upper plate such that the upper plate is configured to move vertically on the first and second guide rods relative to the lower plate. The press assembly further includes an actuation assembly configured to move the upper plate toward the lower plate such that the third die contacts the first electrical terminal and the first electrical terminal is bent into a first predetermined shape between the first and third dies, and the fourth die contacts the second electrical terminal and the second electrical terminal is bent into a second predetermined shape between the second and fourth dies.

A method for bending electrical terminals of battery cells utilizing a press assembly in accordance with another exemplary embodiment is provided. The press assembly has a supporting member, a lower plate having first and second dies coupled thereto, an upper plate having third and fourth dies coupled thereto, and an actuation assembly. The method includes holding a first body portion of a first battery cell on the supporting member. The first battery cell has first and second electrical terminals extending from the first body portion. The method further includes holding the first and second electrical terminals of the first battery cell on the first and second dies, respectively. The method further includes moving the upper plate toward the lower plate utilizing the actuation assembly such that the third die contacts the first electrical terminal and the first electrical terminal is bent into a first predetermined shape between the first and third dies, and the fourth die contacts the second electrical terminal and the second electrical terminal is bent into a second predetermined shape between the second and fourth dies.

DETAILED DESCRIPTION OF EXEMPLARY EMBODIMENTS

Figure 1:
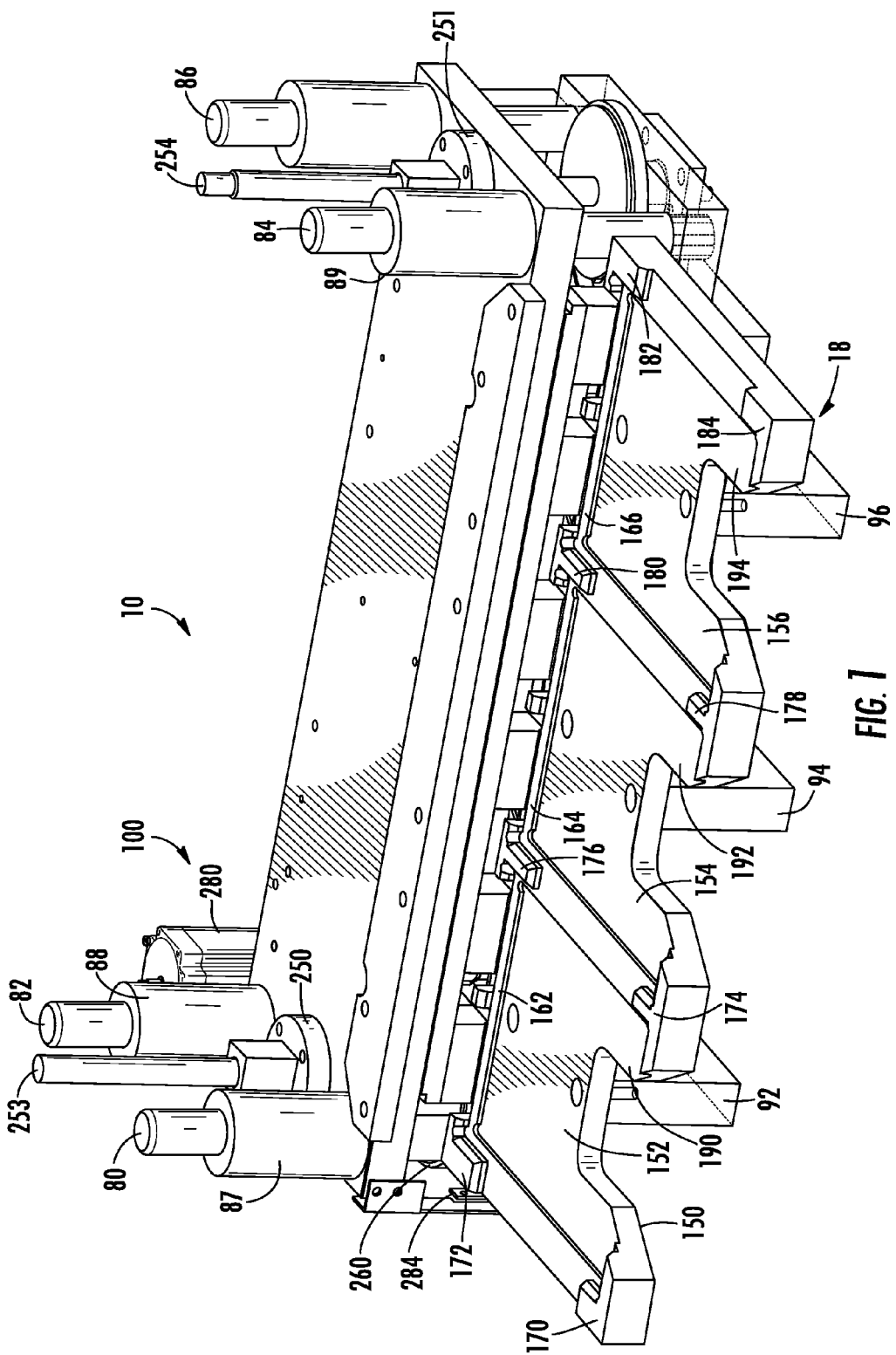
FIG. 1 is a schematic of a press assembly in accordance with an exemplary embodiment.
Figure 2:
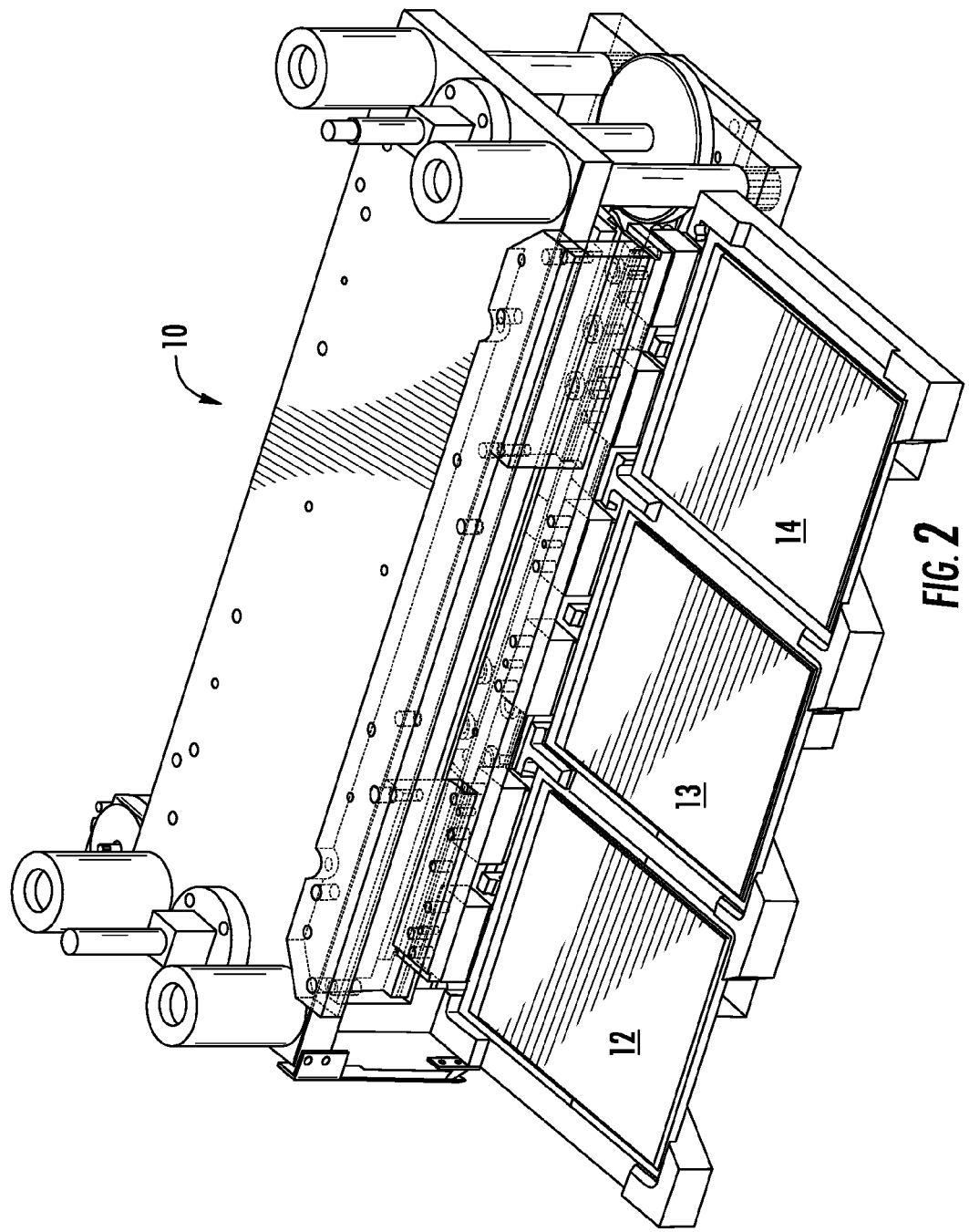
FIG. 2 is another schematic of the press assembly of FIG. 1 having battery cells disposed thereon.
Figure 3:
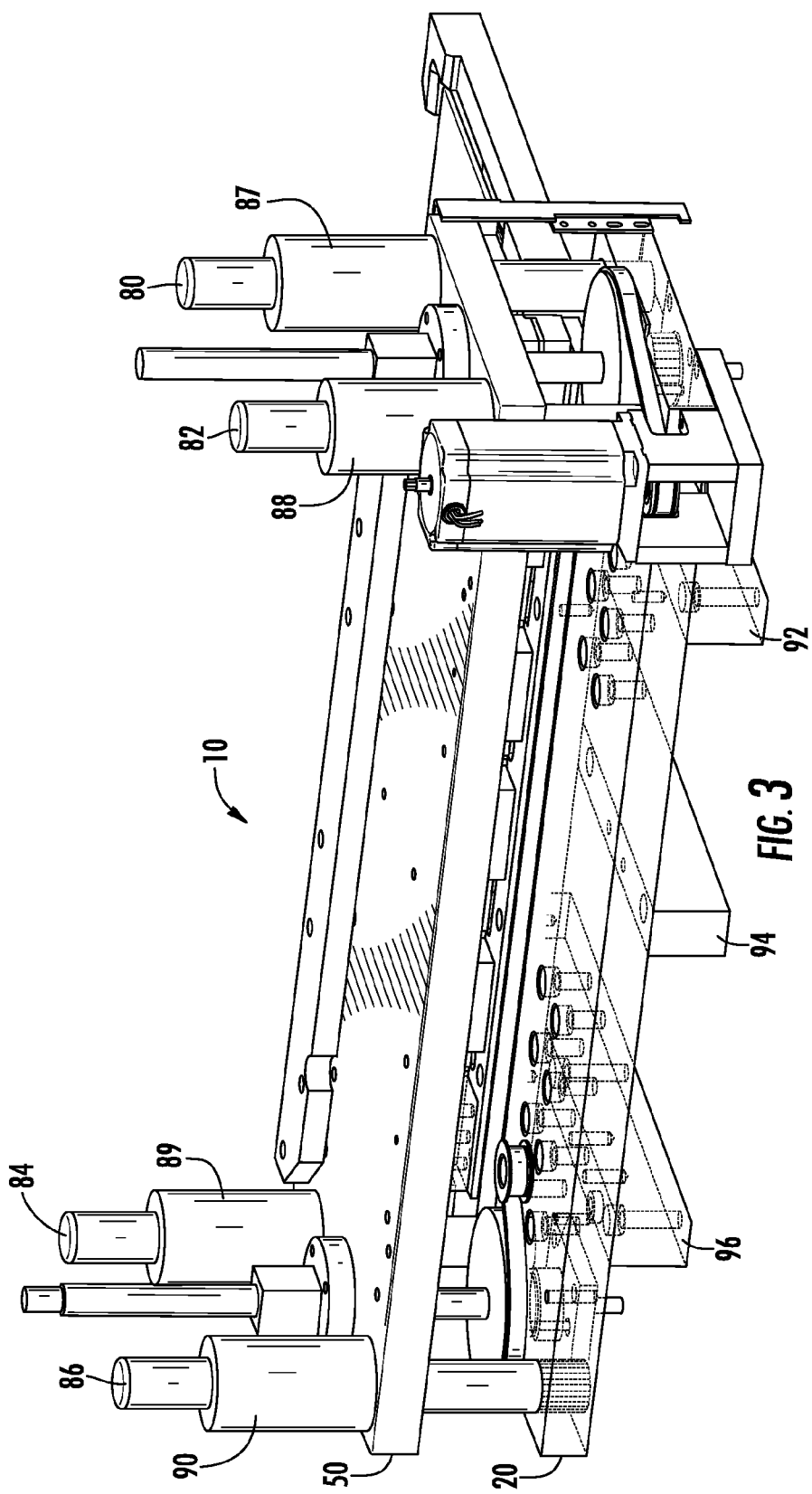
FIG. 3 is another schematic of the press assembly of FIG. 1.

Referring to FIGS. 1-5, a press assembly 10 for bending electrical terminals of battery cells into predetermined shapes in accordance with an exemplary embodiment is provided. The press assembly 10 includes a supporting member 18, a lower plate 20, a lower holding member 22, dies 30, 32, 34, 36, 38, 40, an upper plate 50, an upper holding member 52, dies 60, 62, 64, 66, 68, 70, guide rods 80, 82, 84, 86, bushings 87, 88, 89, 90, cross-members 92, 94, 96, and an actuation assembly 100.

Figure 5:
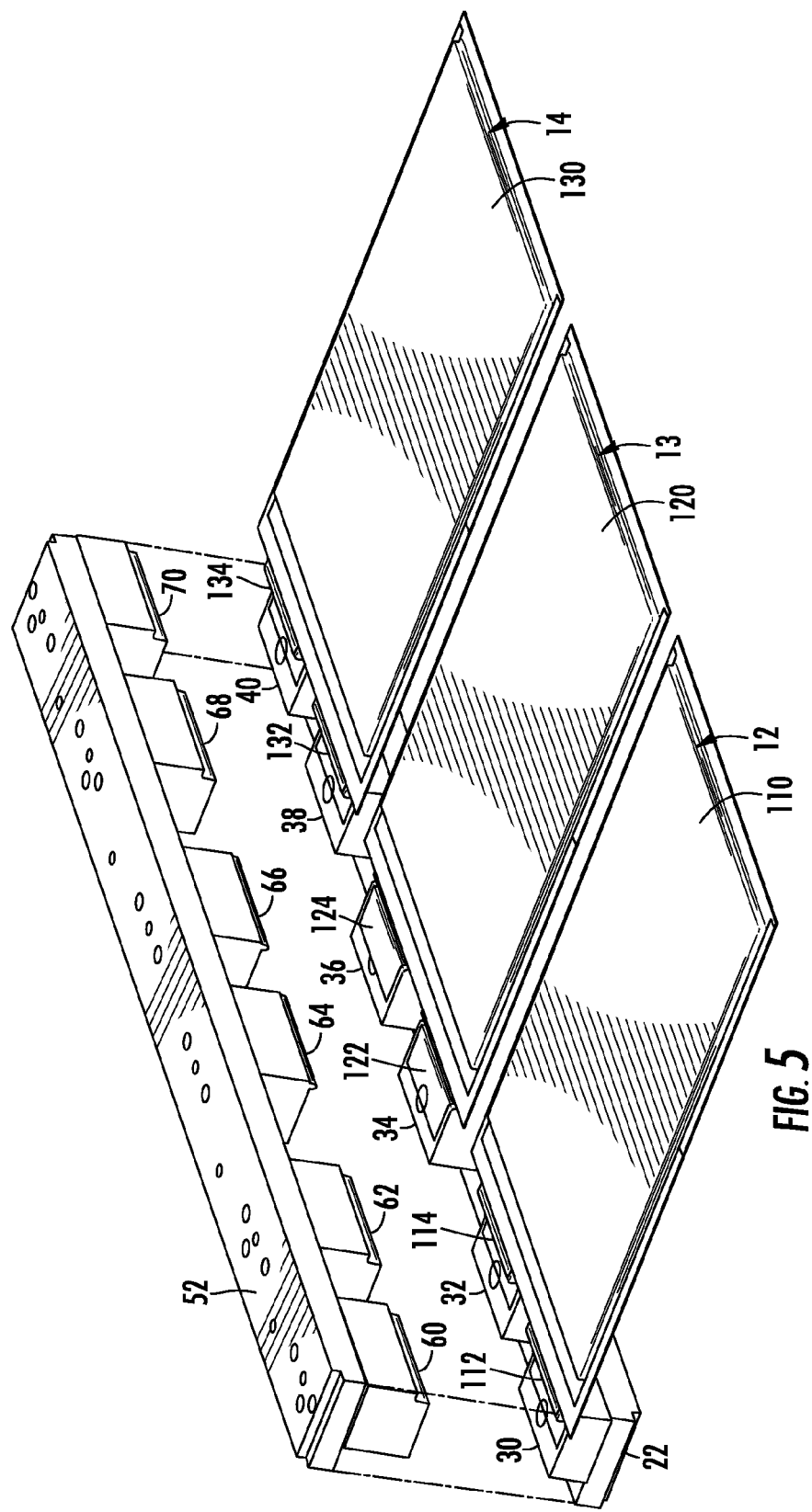
FIG. 5 is a schematic of dies utilized in the press assembly of FIG. 1 having an open operational position.
Figure 6:
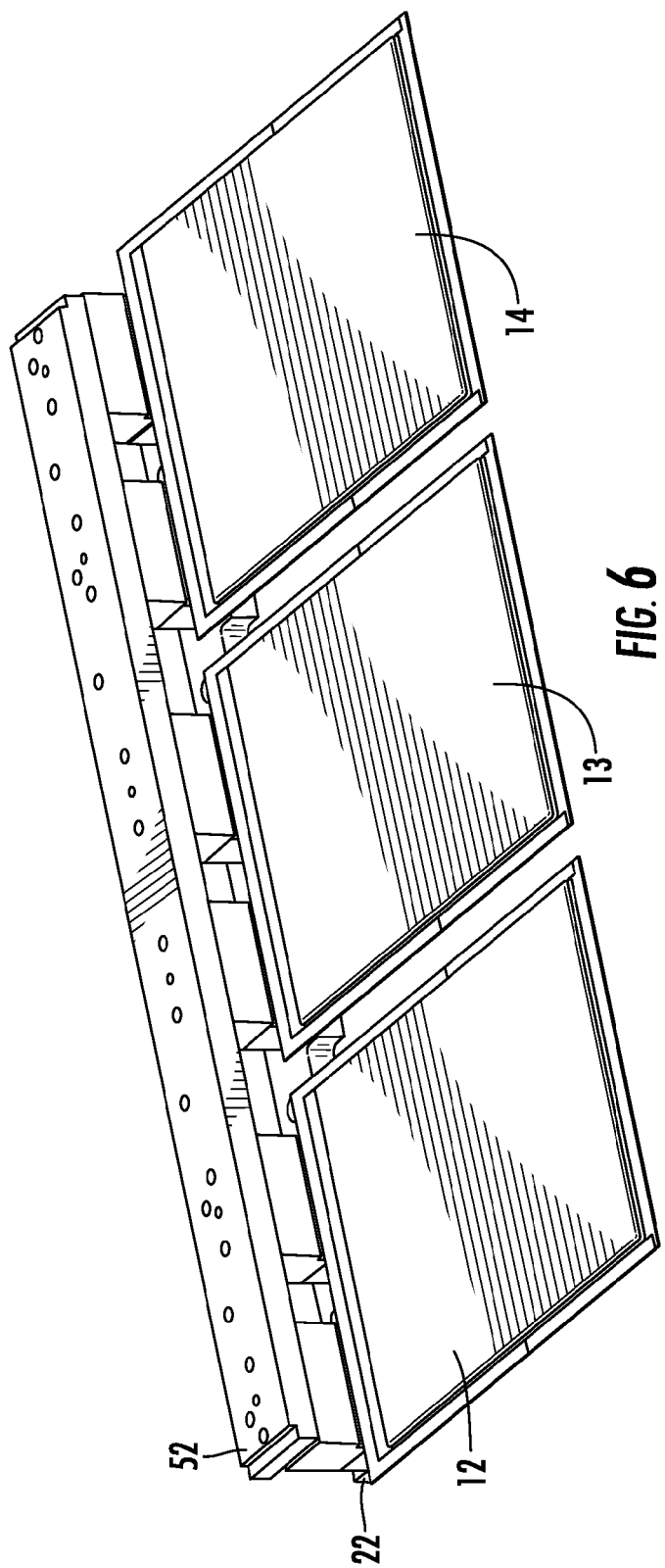
FIG. 6 is a schematic of dies utilized in the press assembly of FIG. 1 having a closed operational position.
Figure 7:
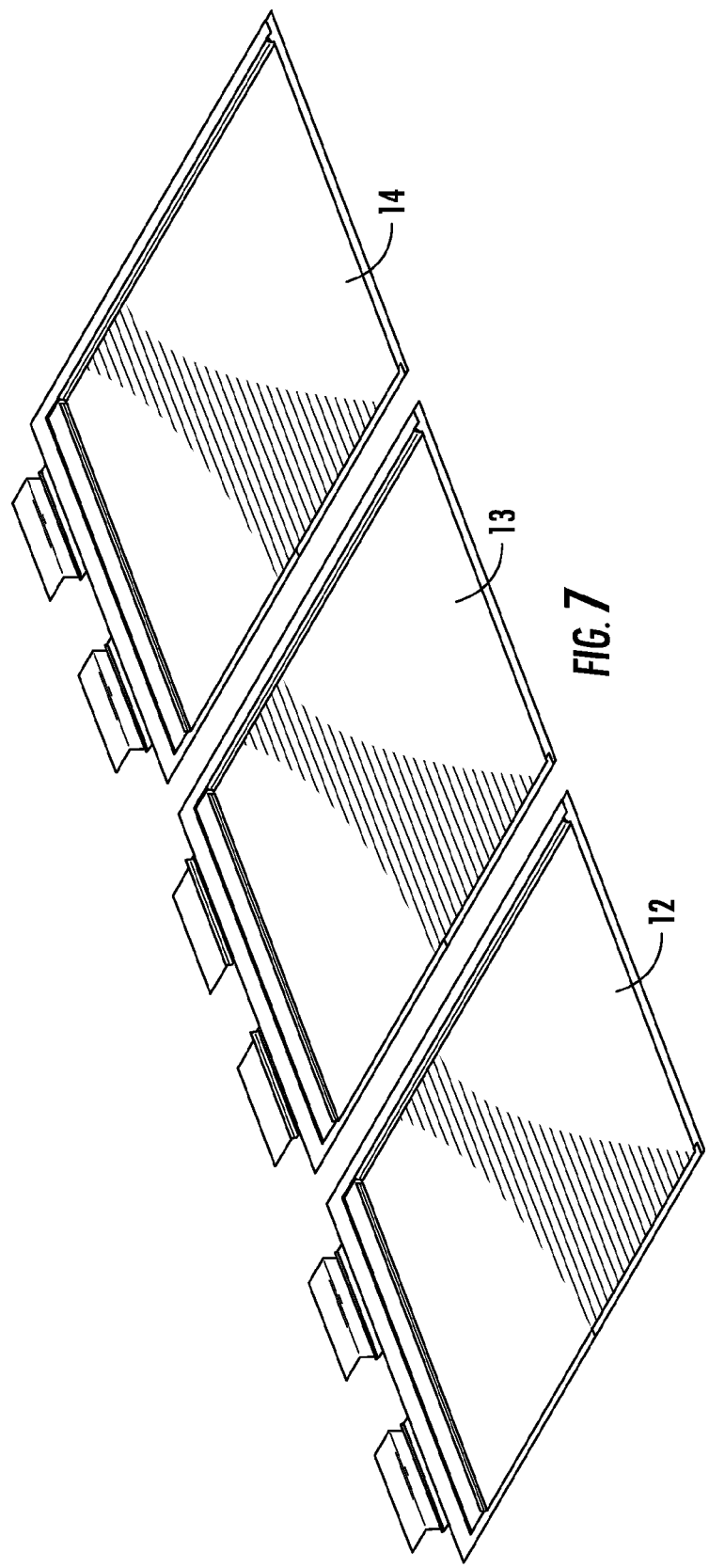
FIG. 7 is a schematic of battery cells having electrical terminals bent in predetermined shapes.
Figure 8:
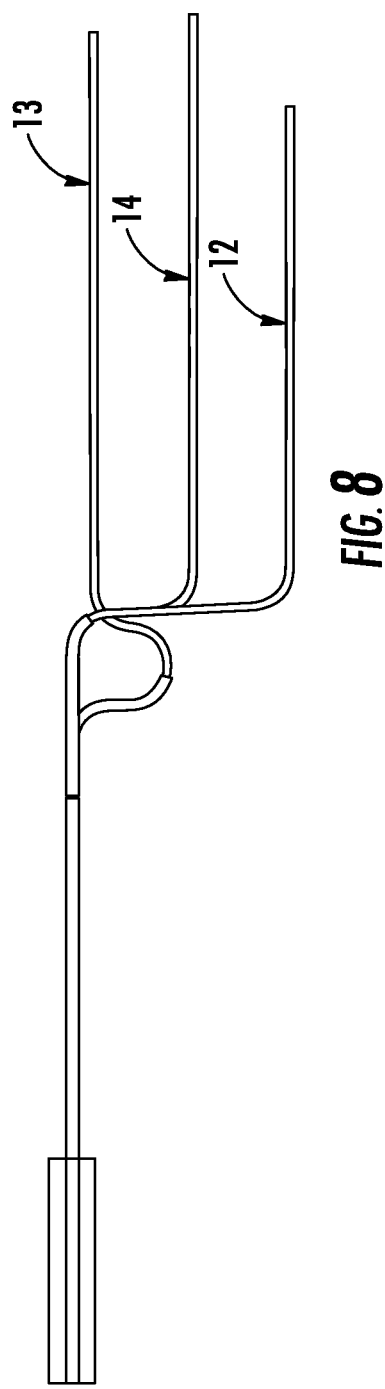
FIG. 8 is a schematic comparing first, second, and third electrical terminals each having a different predetermined shape.
Figure 9:
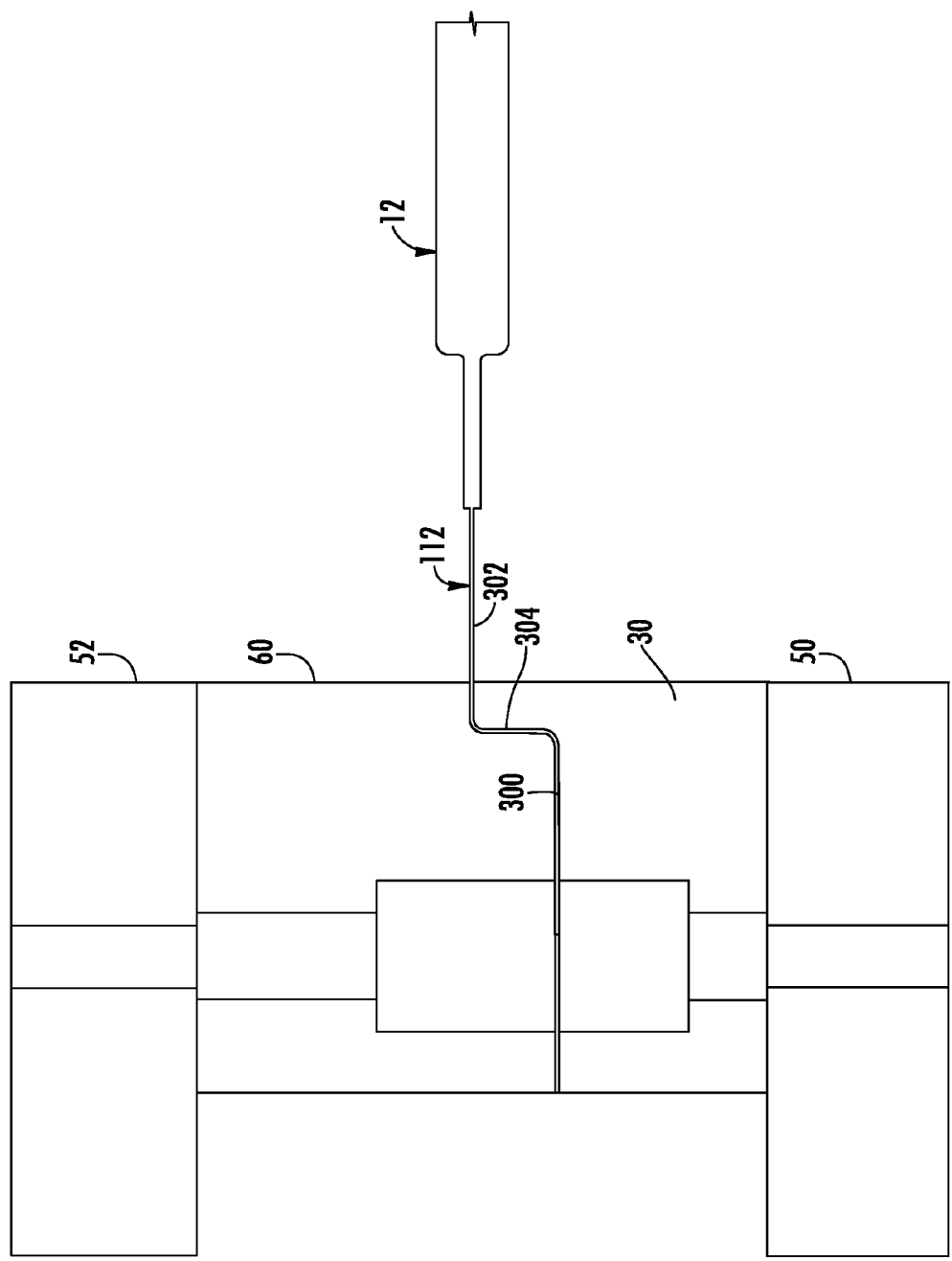
FIG. 9 is a schematic of the dies utilized to bend the first electrical terminal of FIG. 8 into a first predetermined shape.
Figure 10:
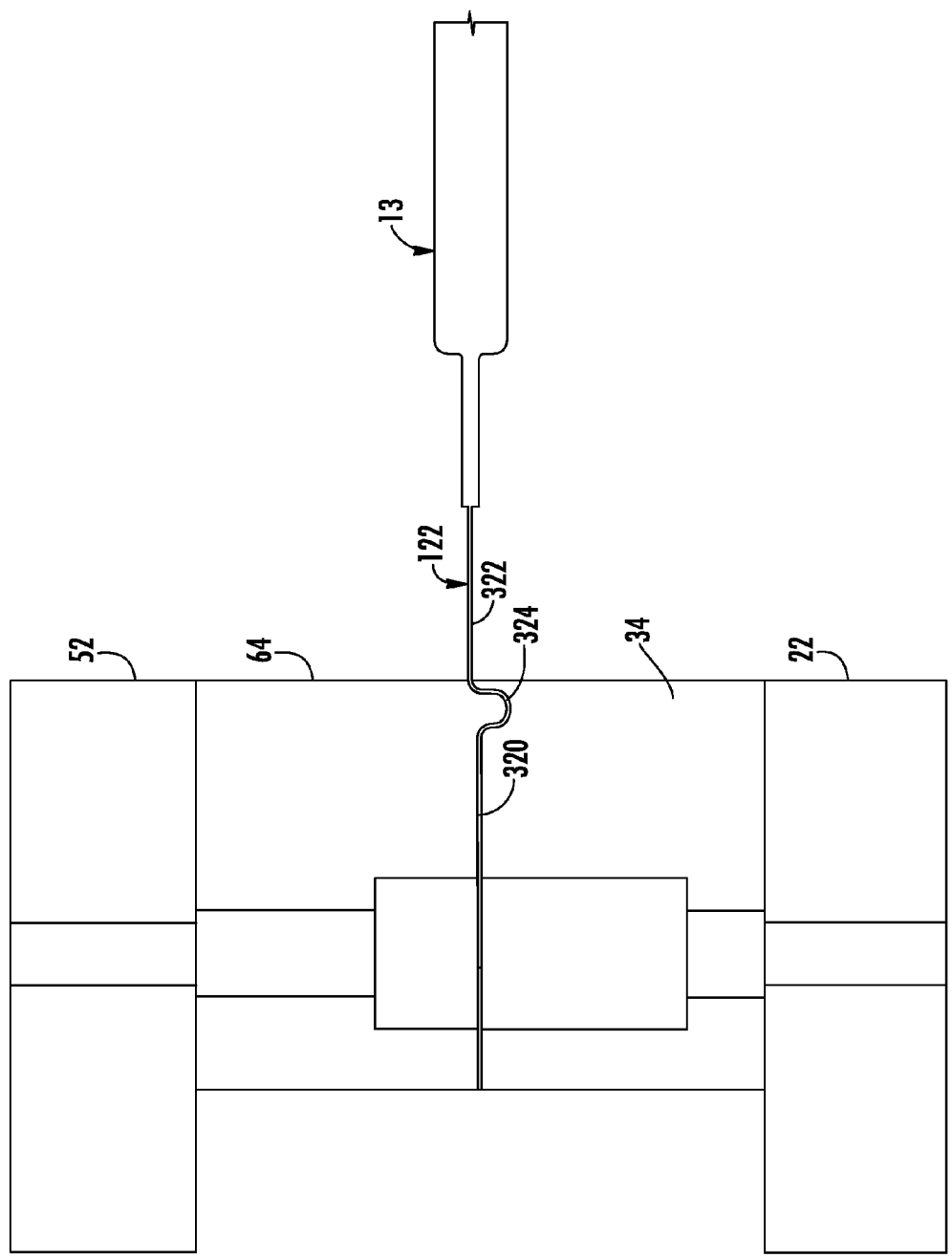
FIG. 10 is a schematic of the dies utilized to bend the second electrical terminal of FIG. 8 into a second predetermined shape.
Figure 11:
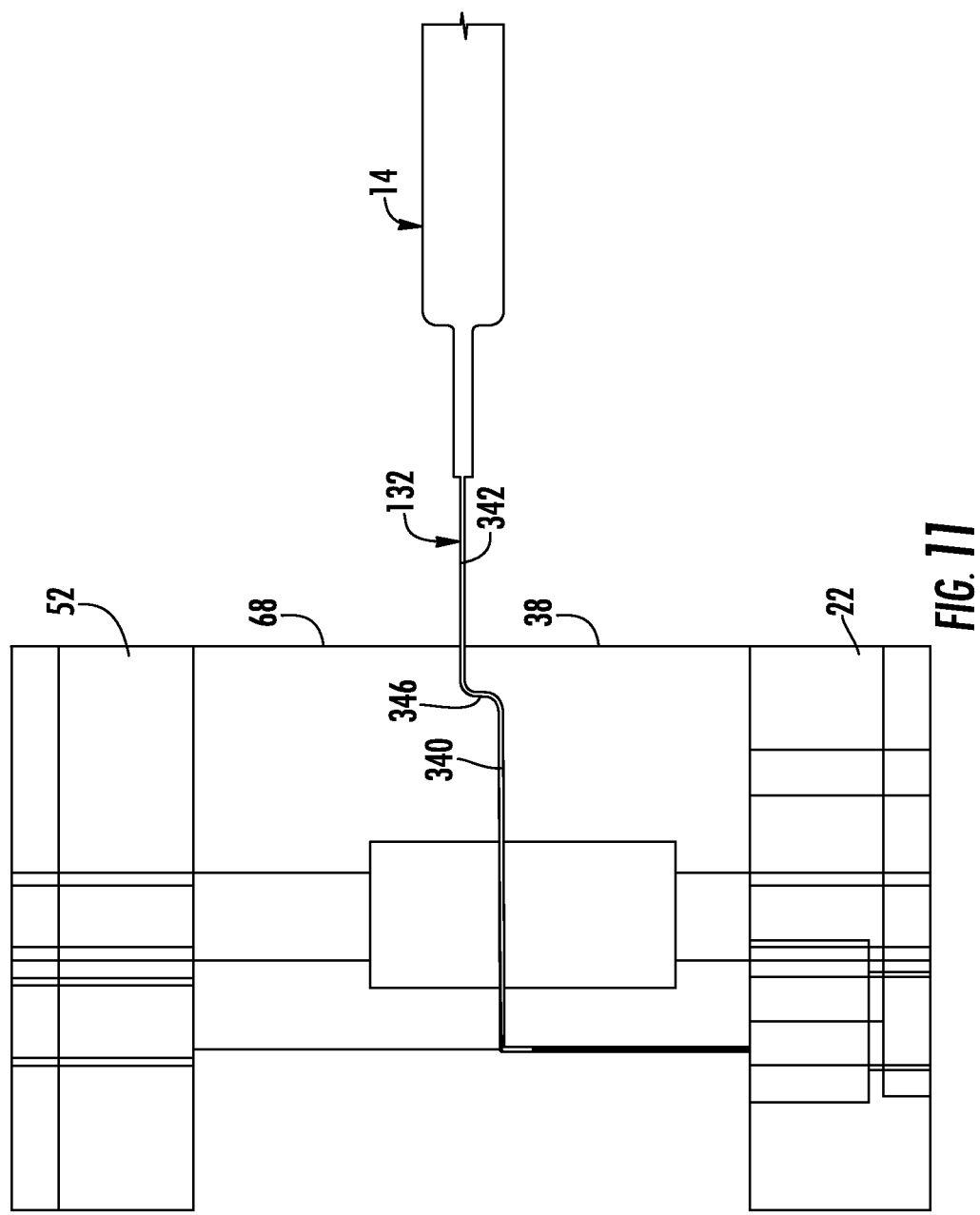
FIG. 11 is a schematic of the dies utilized to bend the third electrical terminal of FIG. 8 into a third predetermined shape.
Figure 15:
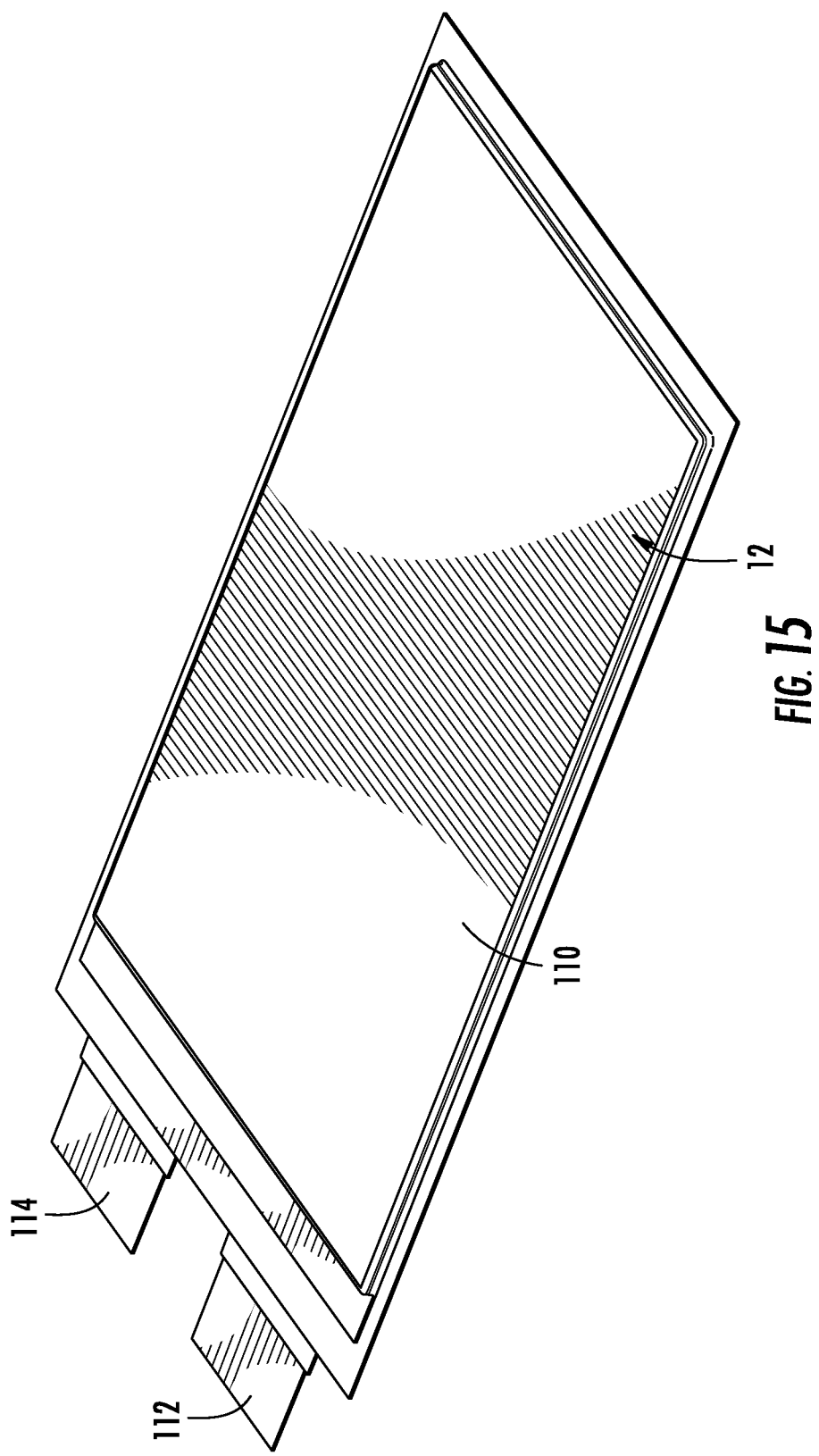
FIG. 15 is a schematic of a battery cell having unbent electrical terminals.

Referring to FIGS. 5, 7 and 15, in particular, the press assembly 10 is configured to bend electrical terminals of battery cells 12, 13, 14 into predetermined shapes such that the electoral terminals can be readily coupled together in a battery module. The battery cell 12 includes a body portion 110 and electrical terminals 112, 114 extending outwardly from the body portion 110. As shown in FIG. 15, the electrical terminals 112, 114 have a substantially flat profile before being bent by the press assembly 10 into a predetermined shape. The electrical terminal 112 is constructed of aluminum, and the electrical terminal 114 is constructed of copper. In one exemplary embodiment, the battery cell 12 is a pouch type lithium-ion battery cell. Of course, in an alternative embodiment, the battery cell 12 could be other types of battery cells such as a nickel metal hydride battery cell for example. The battery cell 13 includes a body portion 120 and electrical terminals 122, 124 extending outwardly from the body portion 120. The electrical terminals 122, 124 have a substantially flat profile before being bent by the press assembly 10 into a predetermined shape. Similarly, the battery cell 14 includes a body portion 130 and electrical terminals 132, 134 extending outwardly from the body portion 130. The electrical terminals 132, 134 have a substantially flat profile before being bent by the press assembly 10 into a predetermined shape.

Referring to FIGS. 1-4, the supporting member 18 is configured to hold the battery cells 12, 13, 14 thereon. The supporting member 18 includes a plate 150 formed of steel. The plate 150 includes receiving surfaces 152, 154, 156 for receiving the body portions 110, 120, 130, respectively of the battery cells 12, 13, 14, respectively thereon. The plate 150 further includes raised peripheral surfaces 162, 164, 166 formed around the receiving surfaces 152, 154, 156, respectively. Further, the plate 150 includes guide members 170, 172, 174, 176, 178, 180, 182, 184 for assisting a user in guiding the battery cells 12, 13, 14 onto the supporting member 18. Finally, the plate 150 includes notches 190, 192, 194 which assists a user in placing the battery cells 12, 13, 14 on the supporting member 18 and for removing the battery cells 12, 13, 14 from the supporting member 18. The supporting member 18 is removably coupled to the cross-members 92, 94, 96 utilizing bolts.

Referring to FIGS. 1, 3, 5 and 6, the lower plate 20 is a substantially flat metal plate. The lower holding member 22 is removably coupled to the lower plate 20 utilizing bolts. Further, the dies 30-40 are removably coupled to the lower holding member 22 utilizing bolts such that the lower holding member 22 is disposed between the lower plate 20 and the dies 30-40.

The upper plate 50 is a substantially flat metal plate. The upper holding member 52 is removably coupled to the upper plate 50 utilizing bolts. Further, the dies 60-70 are removably coupled to the upper holding member 52 utilizing bolts such that the upper holding member 52 is disposed between the upper plate 50 and the dies 60-70.

The guide rods 80, 82, 84, 86 are disposed between the lower plate 20 and the upper plate 50 and further extend upwardly from the upper plate 50. In particular, guide rods 80, 82, 84, 86 are fixedly coupled to the lower plate 20 and extend through corresponding apertures in the upper plate 50 such that the upper plate 50 moves vertically on the guide rods relative to the lower plate 20. The guide rods 80, 82, 84, 86 are constructed of steel.

The bushings 87, 88, 89, 90 are fixedly attached to the upper plate 50 and are configured to slidably receive the guide rods 80, 82, 84, 86 therein. The bushings 87, 88, 89, 90 are constructed of steel.

The cross members 92, 94, 96 are configured to support the lower plate 20 and a portion of the supporting member 18 thereon. The cross-members 92, 94, 96 are constructed of steel.

Figure 4:
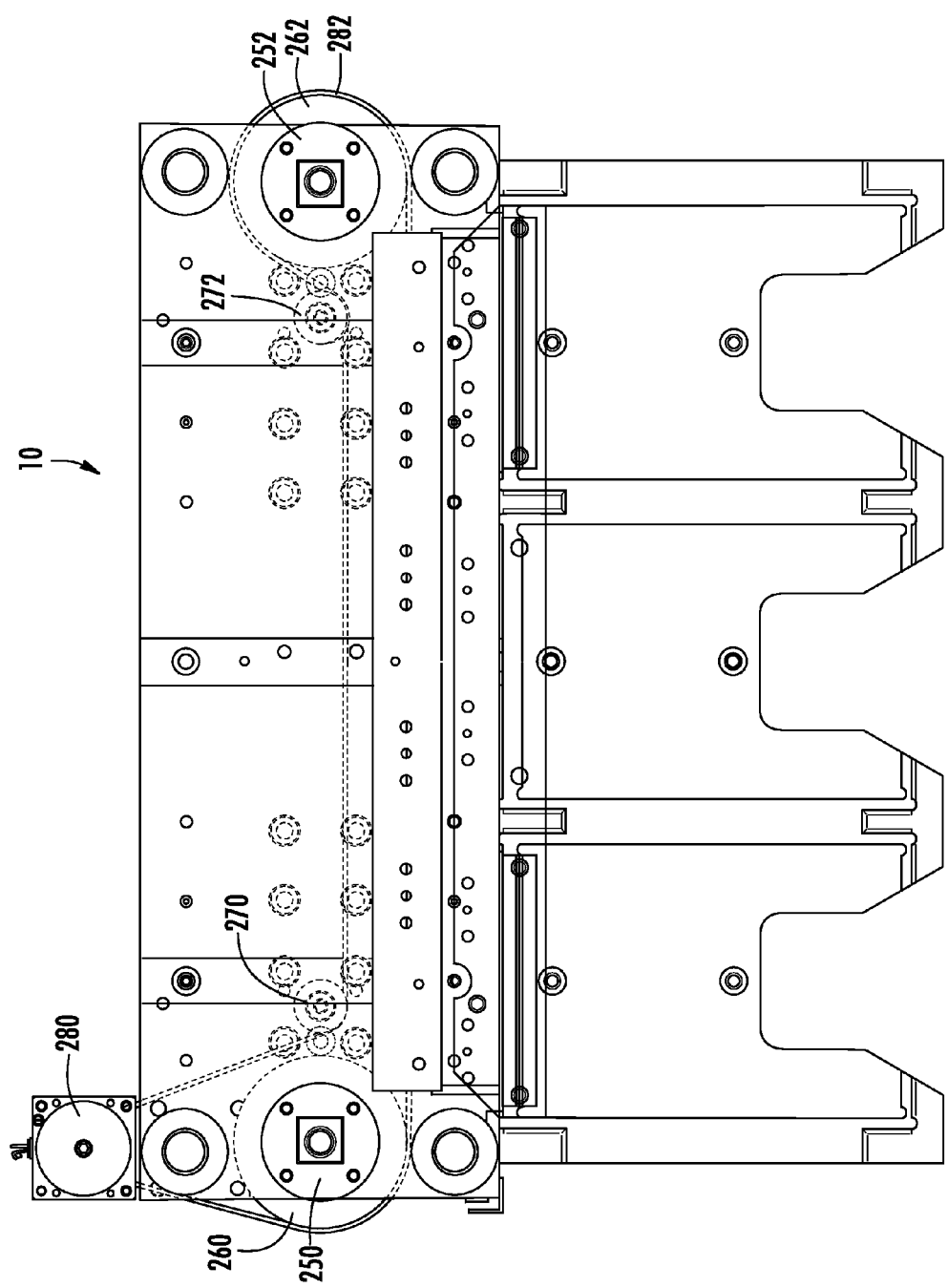
FIG. 4 is a top view of the press assembly of FIG. 1.
Figure 12:
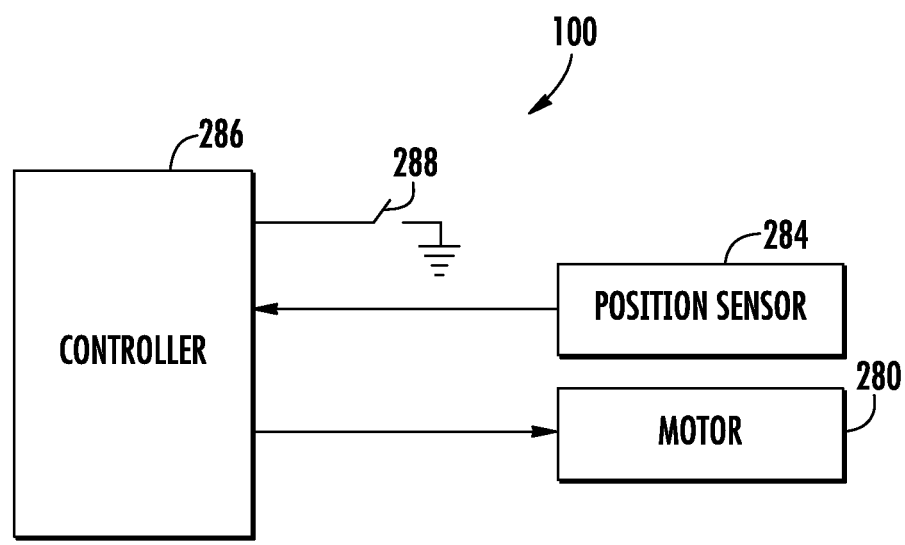
FIG. 12 is a block diagram of an actuation assembly utilized in the press assembly of FIG. 1.

Referring to FIGS. 1, 4 and 12, the actuation assembly 100 is configured to move the upper plate 50, the upper holding member 52, and the dies 60, 62, 64, 66, 68, 70 vertically upwardly and downwardly relative to the stationary lower plate 20. The actuation assembly 100 includes ball-screw assemblies 250, 252, pulleys 260, 262, 270, 272, a motor 280, a closed-loop belt 282, a position sensor 284, a controller 286, and a switch 288.

The ball-screw assemblies 250, 252 are operably coupled between the lower plate 20 and the upper plate 50. When shafts 253, 254 of the ball-screw assemblies 250, 252, respectively, are rotated in a first direction, the upper plate 50 is moved downwardly toward the lower plate 20 by the ball-screw assemblies 250, 252. Alternatively, when the shafts 253, 254 of the ball-screw assemblies 250, 252, respectively are rotated in a second direction, the upper plate 50 is moved upwardly relative to the lower plate 20 by the ball-screw assemblies 250, 252. The pulleys 260, 262, are operably coupled to the shafts 253, 254, respectively such that when the pulleys 260, 262 are rotated, the shafts 253, 254 are rotated in a same direction. The pulleys 270, 272 are rotatably coupled to the upper plate 50 and are utilized to guide portions of the closed-loop belt 282. In particular, the closed-loop belt 282 forms a loop around a portion of the shaft of the motor 280, and a portion of the pulley 260, and a portion of the pulley 262, and a portion of the pulley 272.

The motor 280 has a shaft that is operably coupled to the closed-loop belt 282 for driving the closed-loop belt 282 in either a first direction or a second direction based on control signals from the controller 286. The controller 286 is operably coupled to the motor 280, the position sensor 284 and a switch 288. The controller 286 generates a control signal to induce the motor 280 to initiate rotational movement of the shaft of the motor 280 and vertical movement of the upper plate 50 toward the lower plate 20 based on an operational position of the switch 288. Further, the controller 286 can stop rotational movement of the shaft of the motor 280 and vertical movement of the upper plate 50 toward the lower plate 20 based on position signals obtained from the position sensor 284.

Referring to FIGS. 5, 6, 8, 9 and 15, a brief description of how the system 10 bends the electrical terminal 112 of the battery cell 12 will be explained. Initially, the electrical terminal 112 has a relatively flat profile that rests on a portion of the die 30. When the die 60 is moved downwardly toward the die 30, the dies 60 contacts the electrical terminal 112 and bends the electrical terminal 112 into a first predetermined shape between the dies 30, 60. Thereafter, when the die 60 is moved upwardly away from the die 30, the electrical terminal 112 maintains the first predetermined shape. In particular, electrical terminal 112 has portions 300, 302 that are parallel to one another and another portion 304 disposed therebetween that is perpendicular to both the portions 300, 302.

Referring to FIGS. 5, 6, 8 and 10, a brief description of how the system 10 bends the electrical terminal 122 of the battery cell 13 will be explained. Initially, the electrical terminal 122 has a relatively flat profile that rests on a portion of the die 34. When the die 64 is moved downwardly toward the die 34, the die 64 contacts the electrical terminal 122 and bends the electrical terminal 122 into a second predetermined shape between the dies 34, 64. Thereafter, when the die 64 is moved upwardly away from the die 34, the electrical terminal 122 maintains the second predetermined shape. In particular, electrical terminal 122 has portions 320, 322 that are parallel to one another and an arcuate-shaped portion 324 disposed therebetween that has at least a 180 degree curvature.

Referring to FIGS. 5, 6, 8 and 11, a brief description of how the system 10 bends the electrical terminal 132 of the battery cell 14 will be explained. Initially, the electrical terminal 132 has a relatively flat profile that rests on a portion of the die 38. When the die 68 is moved downwardly toward the die 38, the die 68 contacts the electrical terminal 132 and bends the electrical terminal 132 into a third predetermined shape between the dies 38, 68. Thereafter, when the die 68 is moved upwardly away from the die 38, the electrical terminal 132 maintains the third predetermined shape. In particular, electrical terminal 132 has portions 340, 342 that are parallel to one another and another portion 346 disposed therebetween that is perpendicular to both the portions 340, 342.

Figure 13:
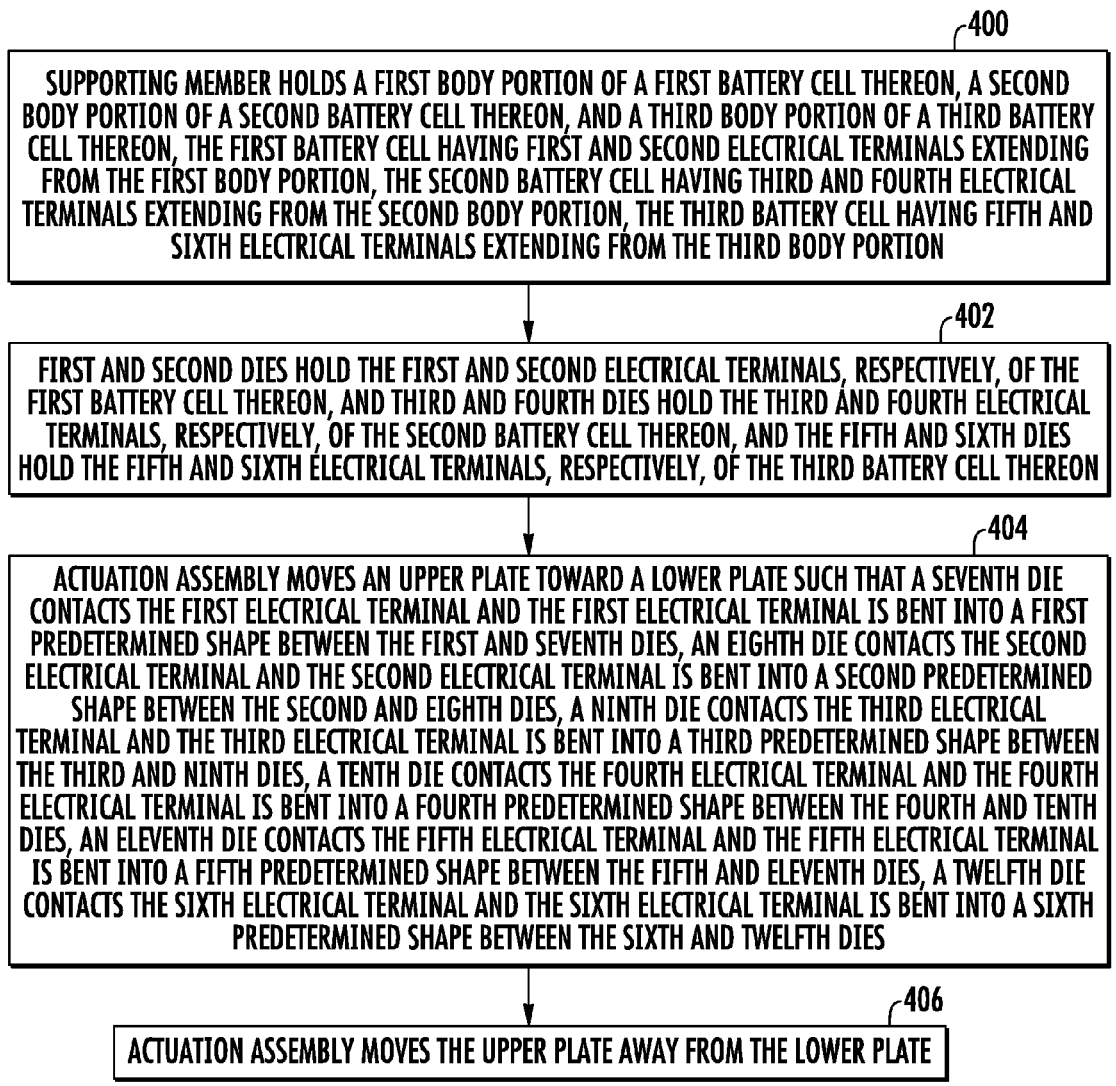
FIG. 13 is a flowchart of method for bending electrical terminals of battery cells in accordance with another exemplary embodiment.

Referring to FIGS. 1, 5 and 13, a method for bending electrical terminals of the battery cells 12, 13 and 14 utilizing the system 10 will now be explained.

At step 400, the supporting member 18 holds the body portion 110 of the battery cell 12 thereon, the body portion 120 of the battery cell 13 thereon, and the body portion 130 of the battery cell 14 thereon. The battery cell 12 has electrical terminals 112, 114 extending from the body portion 110. The battery cell 13 has electrical terminals 122, 124 extending from the body portion 120. The battery cell 14 has electrical terminals 132, 134 extending from the body portion 130.

At step 402, the dies 30, 32 hold the electrical terminals 112, 114, respectively, of the battery cell 12 thereon, and the dies 34, 36 hold the electrical terminals 122, 124, respectively, of the battery cell 13 thereon, and the dies 38, 40 hold the electrical terminals 132, 134, respectively, of the battery cell 14 thereon.

At step 404, the actuation assembly 100 moves the upper plate 50 toward the lower plate 20 such that the die 60 contacts the electrical terminal 112 and the electrical terminal 112 is bent into a first predetermined shape between the dies 60, 30, and the die 62 contacts the electrical terminal 114 and the electrical terminal 114 is bent into a second predetermined shape between the dies 62, 32, and the die 64 contacts the electrical terminal 122 in the electrical terminal 122 is bent into a third predetermined shape between the dies 64, 34, and the die 66 contacts the electrical terminal 124 and the electrical terminal 124 is bent into a fourth predetermined shape between the dies 66, 36, and the die 68 contacts the electrical terminal 132 and the electrical terminal 132 is bent into a fifth predetermined shape between the dies 68, 38, and the die 70 contacts the electrical terminal 134 and the electrical 134 is bent into a sixth predetermined shape between the dies 70, 40.

At step 406, the actuation assembly 100 moves the upper plate 50 away from the lower plate 20.

Figure 14:
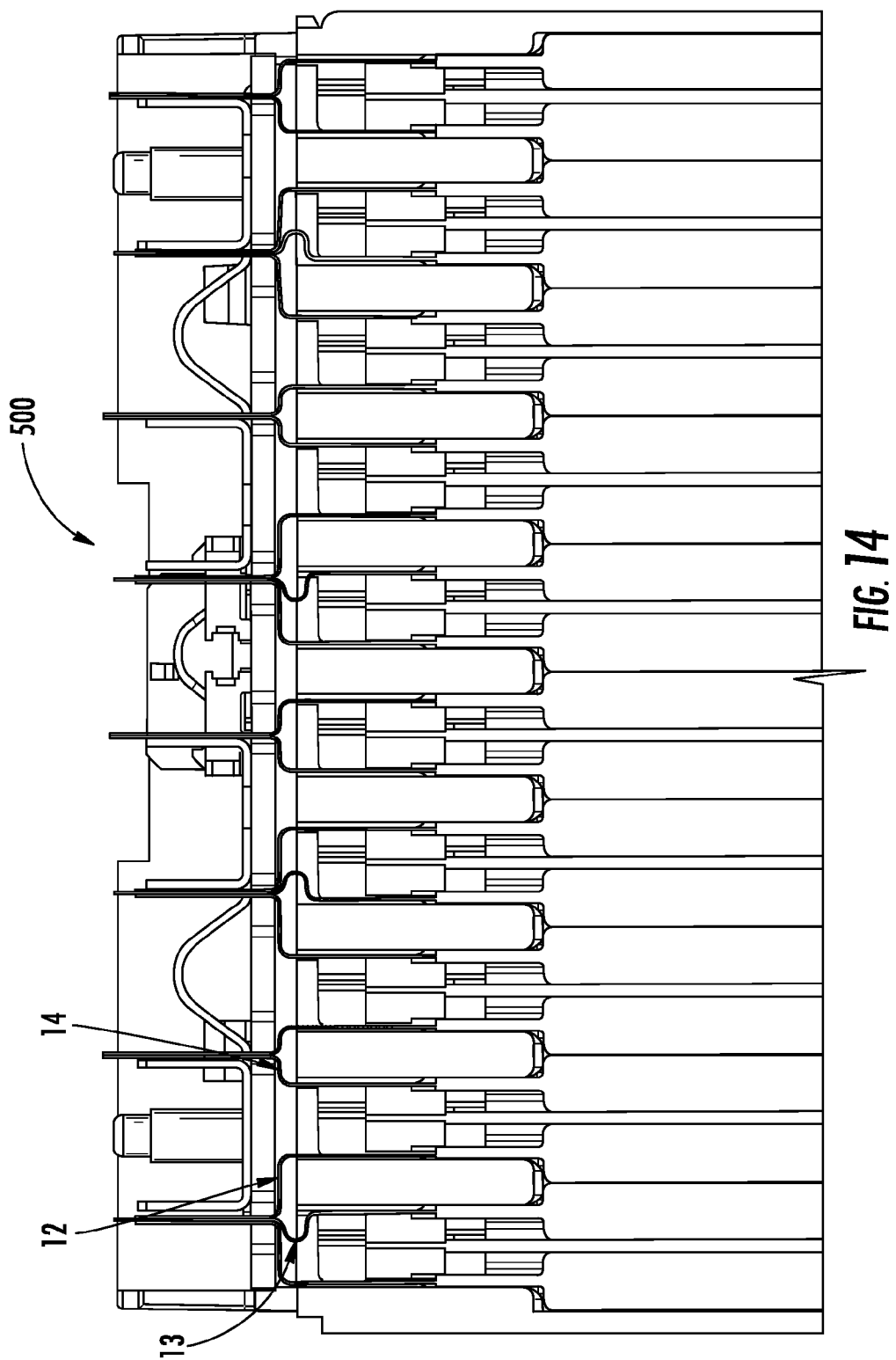
FIG. 14 is a schematic of a battery module utilizing battery cells having the first, second, and third electrical terminals of FIG. 8.

Referring to FIG. 14, a portion of a battery module 500 having a plurality of battery cells is illustrated. In particular, the battery module 500 includes the battery cells 12, 13, 14 having the electrical terminals previously bent into the predetermined shapes.

The above-described press assembly and method provide a substantial advantage over other assemblies and methods. In particular, the press assembly and method provide a technical effect of efficiently bending electrical tabs battery cells to desired predetermined shapes.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

We claim:

1. A press assembly for bending electrical terminals of battery cells, comprising:
   a supporting member having a receiving surface, a raised peripheral surface, and at least first and second guide members; the raised peripheral surface disposed around at least a portion of the receiving surface; the receiving surface configured to hold a first body portion of a first battery cell thereon, the first and second guide members disposed on the raised peripheral surface and configured to guide placement of the first battery cell onto the supporting member, the first battery cell having first and second electrical terminals extending from the first body portion;
   a lower plate having first and second dies coupled thereto, the first and second dies configured to hold the first and second electrical terminals, respectively, of the first battery cell thereon;
   an upper plate having third and fourth dies coupled thereto;
   at least first and second guide rods being disposed between the lower plate and the upper plate such that the upper plate is configured to move vertically on the first and second guide rods relative to the lower plate; and
   an actuation assembly configured to move the upper plate toward the lower plate such that the third die contacts the first electrical terminal and the first electrical terminal is bent into a first predetermined shape between the first and third dies, and the fourth die contacts the second electrical terminal and the second electrical terminal is bent into a second predetermined shape between the second and fourth dies.

2. The press assembly of claim 1, wherein the supporting member is further configured to hold a second body portion of a second battery cell thereon, the second battery cell having third and fourth electrical terminals extending from the second body portion, wherein the lower plate further includes fifth and sixth dies coupled thereto, the fifth and sixth dies configured to hold the third and fourth electrical terminals, respectively, of the second battery cell thereon; and
   the upper plate further having seventh and eighth dies coupled thereto;
   the actuation assembly further configured to move the upper plate toward the lower plate such that the seventh die contacts the third electrical terminal and the third electrical terminal is bent into a third predetermined shape between the fifth and seventh dies, and the eighth die contacts the fourth electrical terminal and the fourth electrical terminal is bent into a fourth predetermined shape between the sixth and eighth dies.

3. The press assembly of claim 1, further comprising a lower holding member coupled to the lower plate and the first and second dies, the lower holding member being disposed between the lower plate and the first and second dies.

4. The press assembly of claim 3, further comprising an upper holding member coupled to the upper plate and the third and fourth dies, the upper holding member being disposed between the upper plate and the third and fourth dies.

5. The press assembly of claim 1, wherein the actuation assembly comprises:
   first and second ball screw assemblies coupled between the upper plate and the lower plate;
   first and second pulleys coupled to the first and second ball screw assemblies, respectively; and
   a motor having a closed-loop belt coupled to the first and second pulleys, the motor configured to move the belt in a first direction to induce the first and second ball screw assemblies to move the upper plate downwardly relative to the lower plate, the motor further configured to move the belt in a second direction to induce the first and second ball screw assemblies to move the upper plate upwardly relative to the lower plate.

6. The press assembly of claim 1, wherein the first predetermined shape includes first and second parallel portions with an arcuate-shaped portion disposed therebetween having substantially a 180 degree curvature.

7. The press assembly of claim 1, wherein the first predetermined shape includes first and second parallel portions with a third portion disposed therebetween that is substantially perpendicular to the first and second parallel portions.

8. A method for bending electrical terminals of battery cells utilizing a press assembly, the press assembly having a supporting member, a lower plate having first and second dies coupled thereto, an upper plate having third and fourth dies coupled thereto, and an actuation assembly, the method comprising:

holding a first body portion of a first battery cell on the supporting member, the first battery cell having first and second electrical terminals extending from the first body portion;

holding the first and second electrical terminals of the first battery cell on the first and second dies, respectively; and moving the upper plate toward the lower plate utilizing the actuation assembly such that the third die contacts the first electrical terminal and the first electrical terminal is bent into a first predetermined shape with first and second parallel portions and an arcuate-shaped portion, the arcuate-shaped portion having a first end coupled to the first parallel portion, the arcuate-shaped portion further having a second end coupled to the second parallel portion, and the fourth die contacts the second electrical terminal and the second electrical terminal is bent into a second predetermined shape between the second and fourth dies.

9. The method of claim 8, further comprising:

holding a second body portion of a second battery cell on the supporting member, the second battery cell having third and fourth electrical terminals extending from the second body portion;

holding the third and fourth electrical terminals of the second battery cell on fifth and sixth dies, respectively, of the press assembly; and moving the upper plate toward the lower plate such that the seventh die contacts the third electrical terminal and the third electrical terminal is bent into a third predetermined shape between the fifth and seventh dies, and the eighth die contacts the fourth electrical terminal and the fourth electrical terminal is bent into a fourth predetermined shape between the sixth and eighth dies.

10. The press assembly of claim 1, wherein the first predetermined shape is different than the second predetermined shape.

11. The press assembly of claim 1, wherein the first and second dies are configured to bend the first electrical terminal into the first predetermined shape having first and second parallel portions and an arcuate-shaped portion, the arcuate-shaped portion having a first end coupled to the first parallel portion, the arcuate-shaped portion further having a second end coupled to the second parallel portion.

12. The press assembly of claim 1, wherein the receiving surface has a substantially rectangular shape, and the first and second guide members are disposed proximate to first and second corners, respectively, of the receiving surface.

13. The press assembly of claim 12, further comprising third and fourth guide members disposed on the raised peripheral surface and further disposed proximate to third and fourth corners, respectively, of the receiving surface.

14. The method of claim 8, wherein the moving the upper plate toward the lower plate forms the arcuate-shaped portion having a concave region between the first end and the second end.

* * * * *